(No Model.)
H. F. CRANDALL.
GRAIN BINDER.
No. 372,520. Patented Nov. 1, 1887.
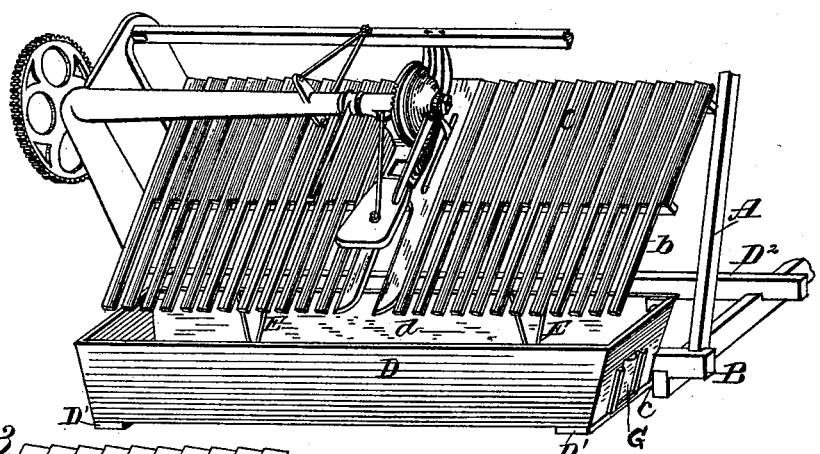
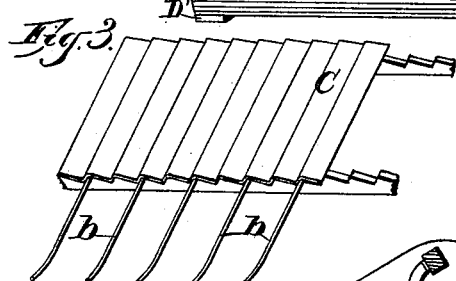
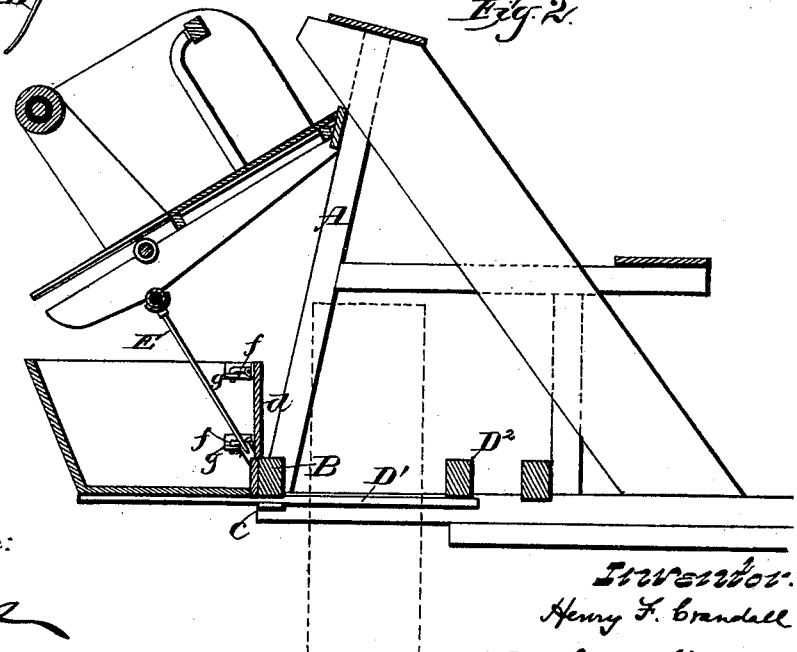
Witnesses:
Inventor:
Henry F. Crandall
By Stout & Underwood
Attorneys.

UNITED STATES PATENT OFFICE.

HENRY F. CRANDALL, OF MILWAUKEE, WISCONSIN, ASSIGNOR OF ONE-HALF TO THE MILWAUKEE HARVESTER COMPANY, OF SAME PLACE.

GRAIN-BINDER.

SPECIFICATION forming part of Letters Patent No. 372,520, dated November 1, 1887.

Application filed August 16, 1886. Serial No. 210,999. (No model.)

*To all whom it may concern:*

Be it known that I, HENRY F. CRANDALL, of Milwaukee, in the county of Milwaukee, and in the State of Wisconsin, have invented certain new and useful Improvements in Grain-Binders; and I do hereby declare that the following is a full, clear, and exact description thereof.

My invention relates to grain-binders, and will be fully described hereinafter.

In the drawings, Figure 1 is a perspective view of a portion of a grain-binder embodying my invention. Fig. 2 is a vertical section of the same. Fig. 3 is a detail of a modification or modified form of grain-deck forming part of my invention.

A is the frame of a binder, and B is the rear sill thereof.

C is the inclined grain-deck, and D a receptacle for receiving grain that is thrashed by the operation of the harvester and binder.

The inclined deck is preferably corrugated or ribbed, the channels made thereby being inclined, and then from the lower edge of said deck are extended fingers $b$, between which the thrashed grain can fall into the receptacle D as the bundles are delivered from the deck.

The receptacle D is preferably hung to the binder-frame by means of arms D', that project from beneath the receptacle and rest upon hangers $c$, that are secured to the under side of the sill B, the inner ends of these arms resting up against the inner sill, $D^2$, so that the preponderance of the receptacle will steady it in place.

It will be noticed that the receptacle D extends out beyond the frame of the binder, so as to have its transverse center about in line with the lower edge of the deck, this arrangement of said receptacle and deck serving to insure the catching of all the loose grain. The rear portion, $d$, of the receptacle is made removable, to admit of the latter being adjusted on the binder, so as to partly inclose the deck-frame supports E. This rear portion is held in place by hooks $f$ and eyes $g$. One end of the receptacle may be provided with a gate or door, G, or may be entirely removable, like the rear portion of the receptacle, to admit of the removal of the grain, as desired.

As shown in Fig. 3, the deck may be corrugated and of metal, and the fingers $b$ may be of wire.

The corrugations or grooves in the deck serve to catch the grain and guide it over and into the receptacle; but I may dispense with the channels and use the receptacle on binders having ordinary decks.

By the use of my device a greater portion of the grain heretofore wasted by thrashing as it is being harvested and bound is caught and saved.

Having thus fully described my invention, what I claim as new, and desire to secure by Letters Patent, is—

1. In a grain-binder, the combination of an inclined corrugated binder-deck terminating in a row of fingers along the lower edge, with a receptacle placed beneath such lower edge and row of fingers, all being arranged so that the shelled grain shall be guided down the corrugations and fall between the fingers and into the receptacle, while the bound bundle is carried over the receptacle by the fingers, as set forth.

2. In a grain-binder, the combination, with the sills B $D^2$, of a grain-receptacle, D, having a removable rear portion, $d$, and a gate, G, at one end thereof, arms D', projecting from beneath the receptacle, and hangers $c$, secured to the under side of the sill B to support said arms, as set forth.

In testimony that I claim the foregoing I have hereunto set my hand, at Milwaukee, in the county of Milwaukee and State of Wisconsin, in the presence of two witnesses.

HENRY F. CRANDALL.

Witnesses:
S. S. STOUT,
MAURICE F. FREAR.